INVENTORS
PETER L. MORAWETZ
RICHARD J. PETSCHAUER
BY EUGENE A. KRUSCHKE
Braddock & Burd
ATTORNEYS INVENTORS
PETER L. MORAWETZ
RICHARD J. PETSCHAUER
BY EUGENE A. KRUSCHKE
Braddock+Burd
ATTORNEYS INVENTORS
PETER L. MORAWETZ
RICHARD J. PETSCHAUER
BY EUGENE A. KRUSCHKE
Braddock & Burd
ATTORNEYS INVENTORS
PETER L. MORAWETZ
RICHARD J. PETSCHAUER
EUGENE A. KRUSCHKE
BY
Braddock + Burd
ATTORNEYS United States Patent Office 3,375,440

Patented Mar. 26, 1968

3,375,440

HYSTERESIS LOOP CHECKER FOR MAGNETIC MEMORY ARRAY ELEMENTS

Peter L. Morawetz, Richard J. Petschauer, and Eugene A. Kruschke, Minneapolis, Minn., assignors to Fabri-Tek Incorporated, Minneapolis, Minn., a corporation of Wisconsin Filed Apr. 15, 1965, Ser. No. 448,763
3 Claims. (Cl. 324—34)

The invention relates to test and measurement apparatus, and more particularly to display and measurement apparatus for testing the hysteresis loop of an array of magnetic thin films.

Magnetic thin film arrays are typically used in memory systems for modern computers. Stringent requirements are maintained as to the magnetic parameters which characterize the thin film elements. These important parameters, which include average film thickness, hysteresis symmetry, magnetic field intensity characteristics, average skew angle, and average thin film magnetostriction characteristics, are directly affected by the conditions under which the films are prepared. Therefore, a constant check might be kept on the film parameters as films are made, both to reject unusable films and to maintain proper conditions in the fabrication process.

Thin film memory storage elements are bistable ferromagnetic films, typically measuring about 1 x 1.5 millimeters in area and between 500 and 2,000 angstroms thick. Various procedures for preparing such magnetic films are used. One procedure which consistently gets good results employs deposition of magnetic materials from a metal source by evaporation in a vacuum. In vacuum deposition, the evaporation takes place in a bell jar evacuated to a pressure on the order of $10^{-5}$ mm. of mercury. The metal source can assume various configurations depending upon the particular method of heating the material to be evaporated. In one method, a wire of the alloy to be deposited is wound on a tungsten filament, and the filament is heated by passing an electrical current through it. In another method, chunks of the alloy to be evaporated are bombarded by a stream of accelerated electrons, and the heat developed is used to evaporate the metal. These are two of many techniques which have been proposed and tried for the metal evaporation process.

The vaporized metal is allowed to condense onto a dielectric substrate material which forms the supporting surface for the memory elements. These substrates play an important part in determining the films' magnetic behavior. It is important that the proper substrate temperature be maintained to reduce chemical interaction between the thin film and the substrate, which interaction could affect the magnetic properties of the film. During the evaporation process, the substrate is maintained, by conventional means, at a predetermined temperature, and a magnetic field is applied parallel to the plane of the substrate. The magnetic field is used to induce uniaxial magnetic isotropy in the films as they are deposited.

The combination of the heated substrate and the magnetic field is responsible, in some manner not presently known, for establishing a preferred axis of magnetization in the deposited film. The preferred axis, or easy axis, is established in the direction of the applied magnetic field, while a hard axis of magnetization is established in a direction transverse to that of the applied magnetic field.

It is generally desirable for economic reasons to deposit a plurality of thin film elements, or bits, onto a single substrate. This may be done, for example, by placing a stencil over the substrate during the deposition process, or by depositing the film over the entire substrate surface and then etching away portions of the film to form a plurality of bits. A typical array may contain 36 words of thirteen bits or digits each, or a total of 468 bits. Since a single unusable bit or digit requires discarding of the entire substrate, it is again necessary to keep a constant check during and following fabrication to assure the highest yield and reliability of the thin film magnetic storage elements.

Various monitering and control devices are used during the deposition process to maintain the proper thickness of deposition, rate of deposition, alloy composition and levels of other parameters. Though each individual bit or thin film element must be individually tested, it is also advantageous to be able to evaluate the desired parameters of an entire thin film array, shortly after the deposition process is over. By this test, a substantial defect in the fabrication of the array may be quickly detected without the necessity of employing the longer and thus more costly testing of each individual bit or digit.

One method of testing and measuring of the pertinent parameters of the entire thin film array is through the visual display of a hysteresis loop for all thin films deposited on a substrate. From accurate measurement of the hysteresis loop, one may determine such important parameters as: total film saturation flux, film thickness, magnetic symmetry, skew angle, sensitivity to magnetostriction, coercivity, anisotropy, and strength of switching field. Prior art hysteresis loop testing apparatus has encountered difficulties due to the smallness of the signal which it is desired to visually display. That is, the imperfections in the test or measuring apparatus itself will distort the hysteresis loop sufficiently to cause an important inaccuracy in the test measurements.

The purpose of the apparatus of this invention is to provide a more accurate means for the display of the hysteresis loop of an entire thin film array, this is accomplished by placing a second inductance coil in a bucking relation or series opposition to a first inductance coil which detects the signal to be tested from the thin film array on the substrate. If the second coil is exposed to the same external signals as the pickup or signal coil, then since the two coils are in series opposition, ideally the entire effect of external or stray signals should be eliminated, leaving only the desired signal from the thin film array. By properly combining these bucking coils with phase shifting and amplitude adjusting apparatus, it has been found that a highly accurate signal may be presented to an oscilloscope for display of the hysteresis loop of the thin film array, for determination of the pertinent parameters.

It is therefore an object of this invention to provide a means for more accurately measuring the average magnetic parameters of small quantities of magnetic materials, by providing apparatus to eliminate stray or external signals from interfering with the measurement of the signals.

It is a further object of this invention to provide a means for measuring the average magnetic parameters of a plurality of magnetic thin film elements deposited on a single substrate.

It is another object of this invention to provide apparatus for more accurately displaying the hysteresis loop of magnetic thin film arrays on an oscilloscope.

It is a still further object of this invention to provide apparatus for providing a signal for the measurement of average magnetic parameters of a thin film array, the apparatus comprising a pair of coils connected in series opposition, with only one of the coils positioned to receive the desired signal from the thin film array.

It is yet another object of this invention to provide hysteresis loop checking apparatus for a thin film magnetic array, in which a pair of similar inductance coils are connected such that signals received by both coils will essentially be cancelled, and such that only one of the coils receives the desired hysteresis loop signal from the thin film array.

Figure 1:
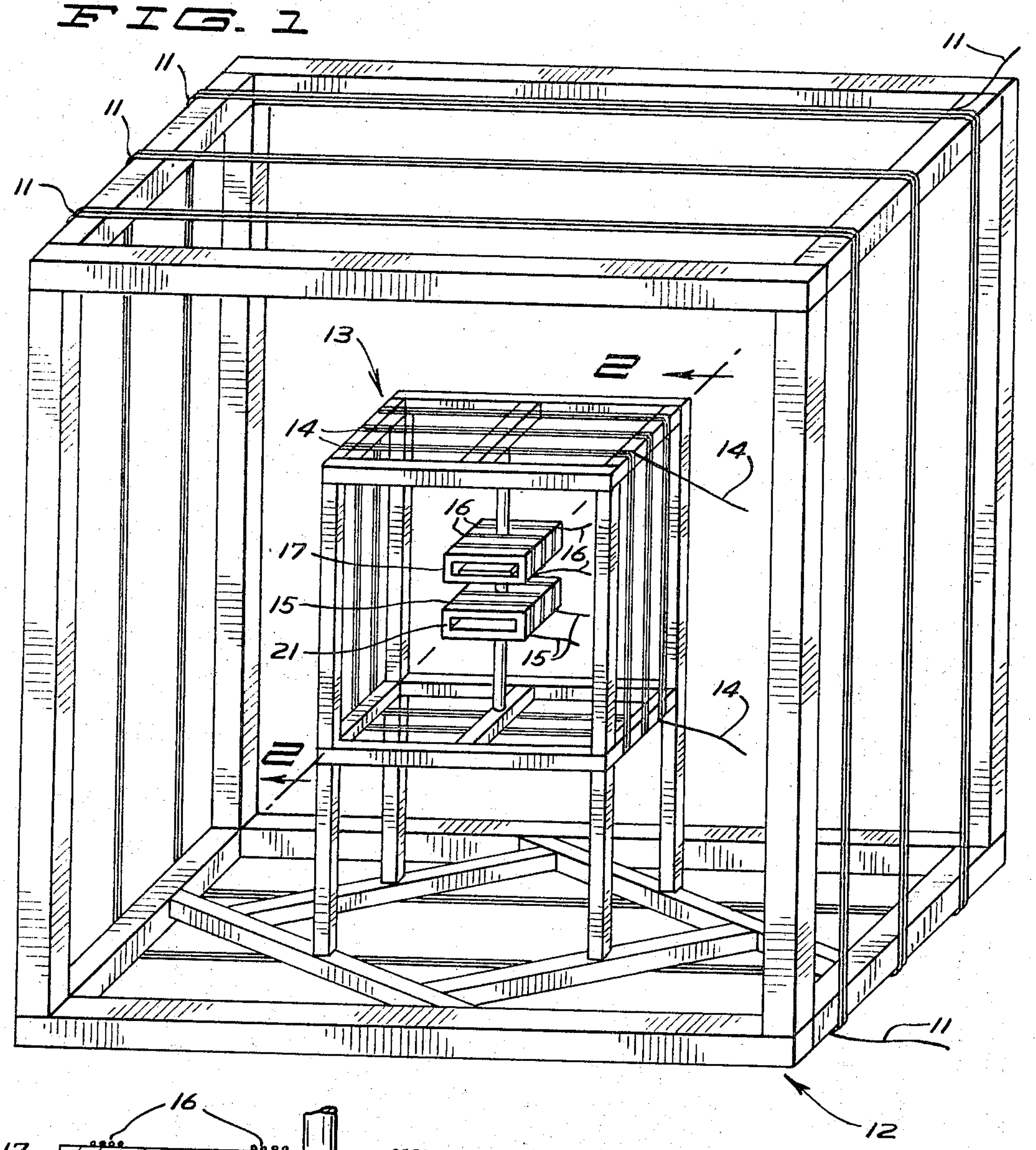
FIG. 1 is a perspective view of a hysteresis loop testing apparatus of this invention, including compensating coils, drive field coils, and pickup coils.

FIG. 1 discloses an earth field compensating coil 11 which is formed in section around a non-magnetic frame 12. Within frame 12 there is shown a field arrangement indicated generally at 13, which field arrangement includes a drive coil 14 sectioned to provide a uniform magnetic field within its area. Mounted within the area of drive coil 14 are a pair of non-magnetic receptacles 17 and 21. A pickup coil 15 encircles receptacle 21, while another pickup coil 16 encircles receptacle 17.

Figure 2:
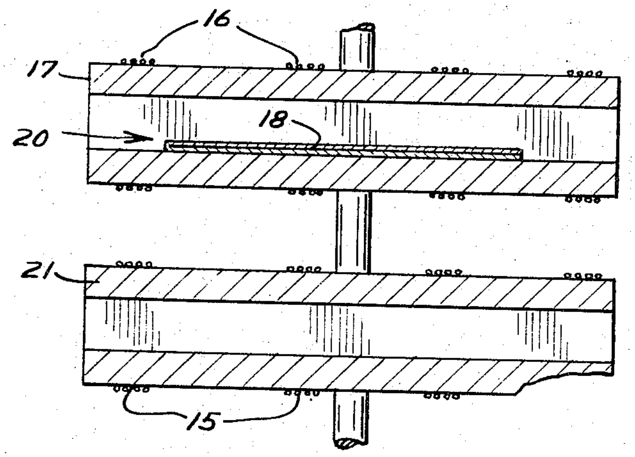
FIG. 2 is an enlarged sectional view of the pickup coils taken along line 2—2 of FIG. 1.

In FIG. 2 the receptacles 17 and 21 are encircled by their respective sectioned coils 16 and 15. A substrate 20 on which there is a deposited magnetic thin film array 18, is shown placed within receptacle 17.

Figure 3:
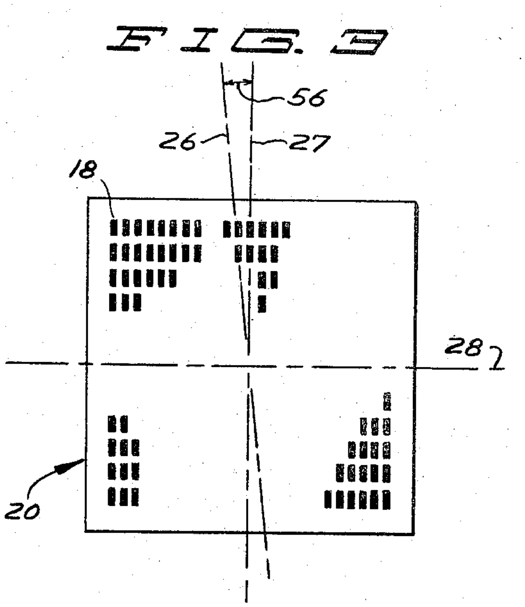
FIG. 3 is a top plan view of a thin film memory array comprising a plurality of rectangular thin film elements deposited on a substrate.

FIG. 3 shows an enlarged view of substrate 20 and thin film array 18, which makes obvious a plurality of bits or digits forming array 18. A line 27 and line 28 represent, respectively, the theoretical preferred or easy axis and the hard axis. In a practical thin film element the actual easy axis, represented by a line 26, may be skewed from the preferred or easy axis by an angle 56.

Figure 4:
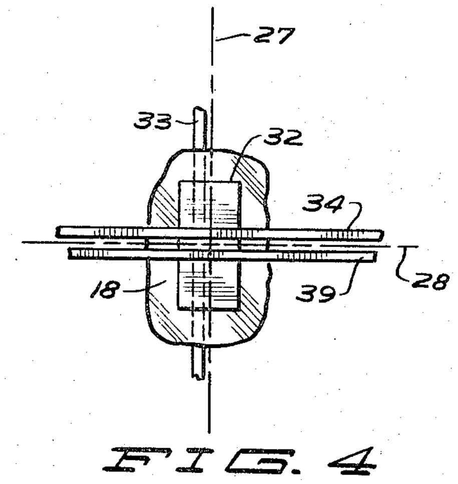
FIG. 4 is a diagram of an individual thin film element or bit of FIG. 2, showing a typical arrangement of electrical current lines for using the array in a memory.

In FIG. 4 there is shown a single digit or bit 32 which is part of array 18 on substrate 20. Placed along the theoretical easy axis 27 is a word current line 33. Placed along the theoretical hard axis 28 are a digit current line 34 and a sense line 39.

Figure 5:
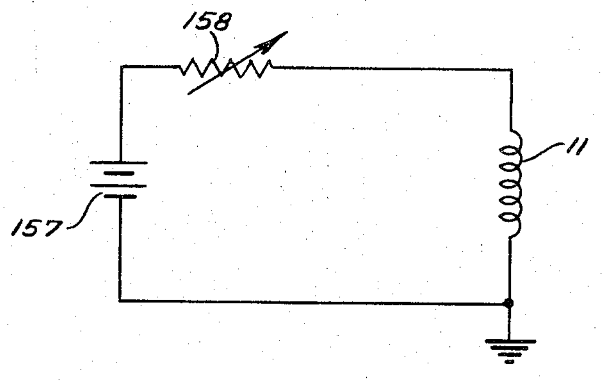
FIG. 5 is a schematic diagram of the power supply circuit for the earth field compensating coil used with this invention.

FIG. 5 shows an earth's field compensation network. A variable resistor 158 is serially connected with earth field compensating coil 11 across a D.C. voltage source 157. Variable resistor 158 will be adjusted such that the field produced by coil 11 substantially counteracts the horizontal component of the earth's magnetic field in the area in which the testing of substrate 20 by coils 15 and 16 is taking place.

Figures 6, 7:
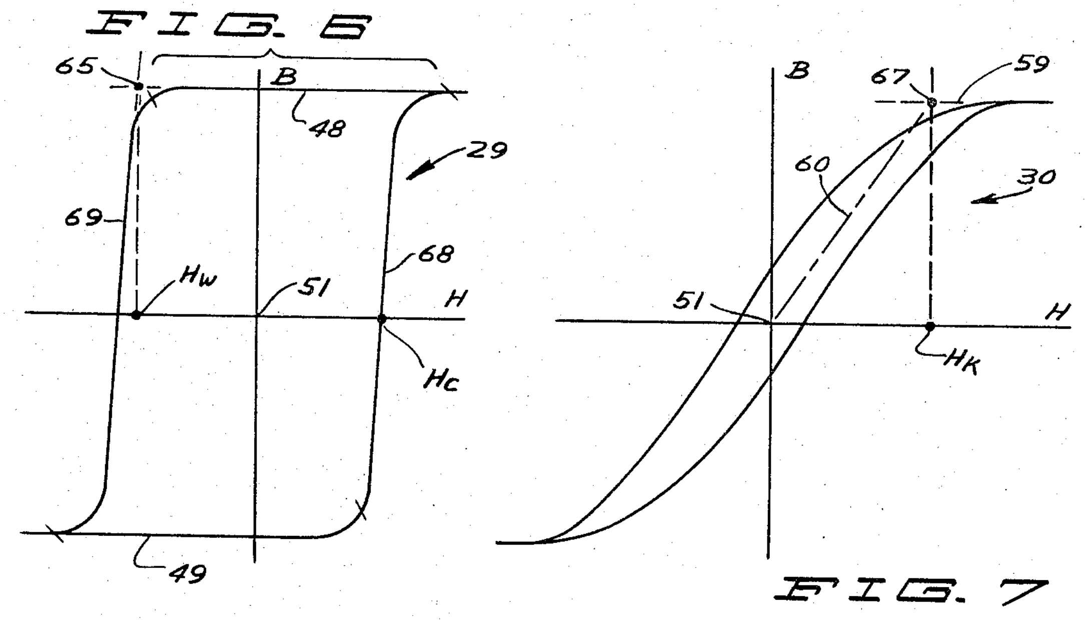
FIG. 6 is a diagram representing the hysteresis loop of a magnetic memory array, whose thin film magnetic easy axis is parallel to the direction of the drive field and to the axis of the pickup coil.
FIG. 7 is a diagram representing the hysteresis loop of a magnetic array whose thin film magnetic hard axis is parallel to the drive field and to the axis of the pickup coil.

FIG. 6 is a diagram of a hysteresis loop 29 which is the result produced along easy axis 27 of array 18, when substrate 20 is placed in receptacle 17 with easy axis 27 parallel to the magnetic drive field created by coil 14. The hysteresis loop 29 is shown to be substantially rectangular, and having substantially vertical sides 68 and 69, and substantially horizontal sides 48 and 49. The loop 29 is shown as being symmetrically placed on the well known magnetic B–H coordinates. A center point 51 is shown as being the origin of coordinates B and H. A point $H_c$ indicates the point of intersection of side 68 and the H coordinate axis. The value of $H_c$ is called the coercivity of the magnetic array producing the hysteresis loop 29, and has a value measured along the H coordinate axis between center point 51 and point $H_c$. There is also shown a point $H_w$ on the H coordinate axis. $H_w$ is called the wall coercivity of the magnetic array producing the loop 29 and represents the value of magnetic field at which magnetic switching begins, and may be measured by taking the value along the H coordinate axis between center point 51 and point $H_w$. Since the hysteresis loop 29 is not truly rectangular in an actual device, but has rounded edges as shown, a substantially accurate value of $H_w$ may be measured by extending, for example, sides 48 and 69 to an intersection point 65 and dropping a line parallel to the B coordinate axis to intersect with the H coordinate axis, which intersection is the point $H_w$.

In FIG. 7, there is another hysteresis loop shown generally at 30, which in this case is non-rectangular and rather narrow. Hysteresis loop 30 is taken along the hard axis of array 18, and is produced by placing substrate 20 in receptacle 17 such that the hard axis of array 18 is parallel to the magnetic drive field created by coil 14. Hysteresis loop 30 is also shown as being symmetrically placed on a set of the well known magnetic B-H coordinates, having the center point 51. There is also shown a point $H_k$ on the H coordinate axis, which represents the anisotropy field of the magnetic array producing loop 30, the value of which may be measured by taking the value between the point $H_k$ and center point 51 on the H coordinate axis. A good approximation of the location of point $H_k$ may be found by drawing a line 59 tangent to the peak of hysteresis loop 30, and another line 60 which starts at center point 51 and has a slope equal to the average slope of the sides of hysteresis loop 30, and finding an intersection 67 between lines 59 and 60, and dropping a line from interesection 67 parallel to the B coordinate axis to intersect with the H coordinate axis. The intersection of this line with the H coordinate axis will be point $H_k$.

Since all of the elements in the array are driven and sensed, the hysteresis loop display represents the average characteristics of the elements. For general process control, this is an advantage, since it eliminates the need to perform manual averaging.

Figure 8:
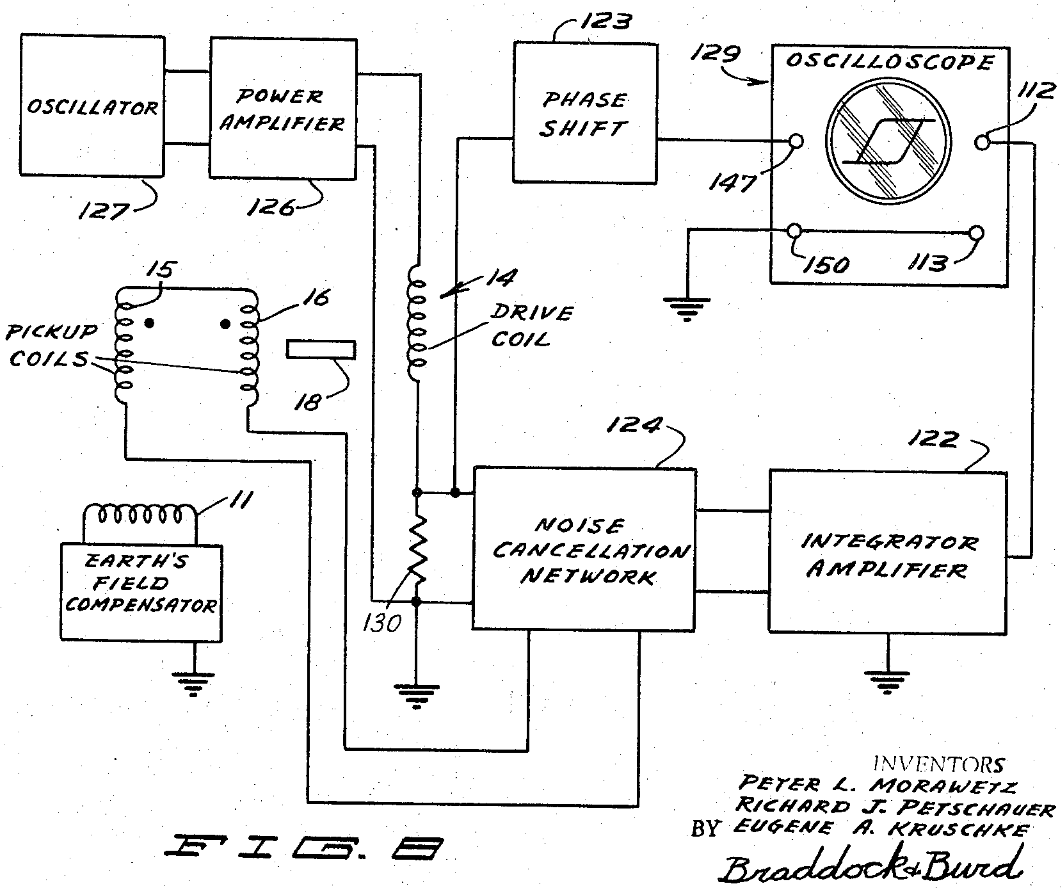
FIG. 8 is a block diagram of an embodiment of the hysteresis loop checker of this invention including an oscilloscope on which the display of the hysteresis characteristics is to be made.

In FIG. 8 there is shown a block diagram of the electronic circuitry of this invention. There is provided a source of bidirectional energy here shown as an oscillator 127. Bidirectional energy in this specification means a varying source of energy capable of causing a varying magnetic field for purposes of hysteresis loop checking, when the source is connected to drive and test equipment as described below. In this embodiment oscillator 127 provides alternating current in the form of a sine wave. The output of oscillator 127 is amplified by a power amplifier 126 and fed to drive coil 14. A sample of the alternating current through drive coil 14, representing the drive field, is taken from a sampling resistor 130 and fed through a phase shift network 123 to a pair of horizontal input terminals 147 and 150 of an oscilloscope 129. The sample of current through drive coil 14 is also fed to a noise cancellation network 124. The magnetic drive field of drive coil 14 results in changing magnetic lines in array 18, which change will be sensed by pickup coil 16. Pickup coils 15 and 16 are serially connected in a bucking or cancelling relation, across noise cancellation network 124. The output of noise cancellation network 124 is fed through an integrator-amplifier 122 to a pair of vertical input terminals 112 and 113 on oscilloscope 129. There is also shown an earth field compensator including earth field compensation coil 11, which is placed around coils 15 and 16 to protect them from external fields.

Figure 9:
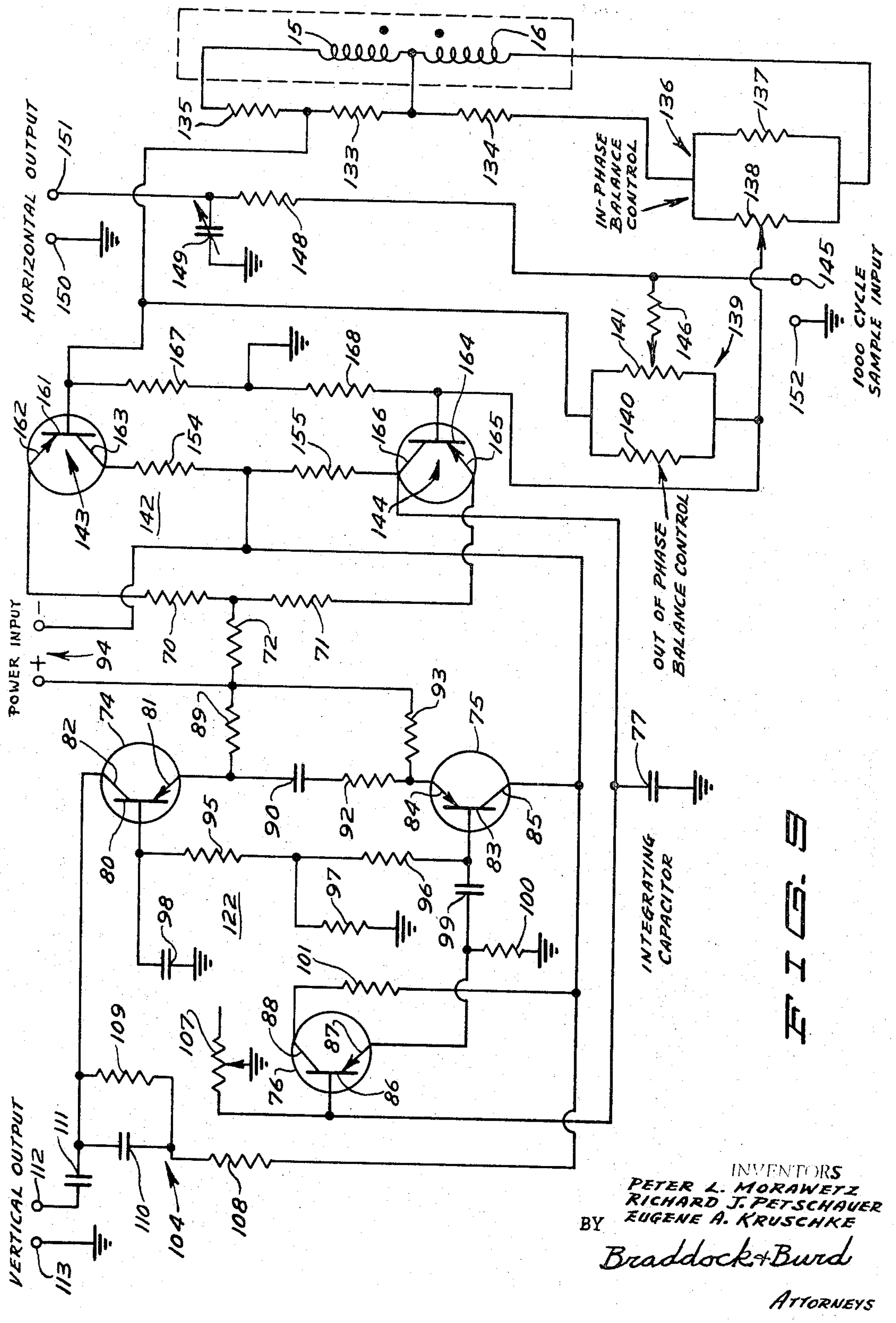
FIG. 9 is a schematic diagram of the hysteresis loop checker sensing network.

In FIG. 9 there is disclosed a schematic diagram of the electronic circuit of this invention. Coils 15 and 16 are serially connected across a voltage divider network which comprises a serial combination of a resistor 135, a resistor 133, a resistor 134 and an in-phase balance control designated generally as 136. In-phase balance control 136 comprises a parallel combination of a resistor 137 and a variable resistor 138. A common junction between coils 15 and 16 is connected to a common junction between resistors 133 and 134. An out-of-phase balance control indicated generally 139, which comprises the parallel combination of a resistor 140 and a variable resistor 141, is connected from the common junction between resistors 133 and 135 to a wiper arm of variable resistor 138. There is also shown a pair of KC sample input terminals 145 and 147. Also shown is a pair of horizontal output terminals 150 and 151, for connection to the horizontal input terminals of an oscilloscope. A resistor 148 is connected between terminal 145 and terminal 151. A variable capacitor 149 is connected between horizontal output terminals 150 and 151. Terminals 147 and 150 are connected to a common ground. Terminal 145 is also connected through a resistor 146 to the wiper arm of variable resistor 141 in the out-of-phase balance control 129.

Also shown is a differential amplifier indicated generally at 142 comprising a pair of transistors 143 and 144. Transistor 143 is here shown as a PNP transistor having an emitter 162, a collector 163 and a base 161. Transistor 144 is also shown as a PNP transistor having an emitter 165, a collector 166 and a base 164. Emitters 162 and 166 are connected together through a serial combination of a resistor 70 and a resistor 71. Bases 161 and 164 are connected together through a serial combination of a resistor 167 and a resistor 168. A common junction between resistors 167 and 168 is connected to the common ground. Collectors 163 and 166 are connected together through a serial combination of a resistor 154 and a resistor 155. The common junction between resistors 154 and 155 is connected to a negative terminal of a power input 94. Base 161 is also connected to the common junction between resistors 133 and 135. Base 164 is also connected to the wiper arm of variable resistor 138 in the in-phase balance control 136.

There is also shown an integrator-amplifier 122. Integrator-amplifier 122 comprises a set of transistors 74, 75, and 76, here shown as PNP transistors. Transistor 74 has an emitter 81, a collector 82 and a base 80. Transistor 75 has an emitter 84, a collector 85 and a base 83. Transistor 76 has an emitter 87, a collector 88 and a base 86. Collectors 82 and 85 are connected together through a serial combination of a resistor 108 and a resistor 109. Emitters 81 and 84 are connected together through a serial combination of a capacitor 90 and a resistor 92, and also through a serial combination of a resistor 89 and a resistor 93. Bases 80 and 83 are connected together through a serial combination of a resistor 95 and resistor 96. A common junction between resistors 95 and 96 is connected through a resistor 97 to the common ground. Base 80 is also connected through a capacitor 98 to the common ground. Base 83 is connected through a capacitor 99 to emitter 87. Emitter 87 is connected through a resistor 100 to the common ground. Collector 88 is connected to collector 85 through a resistor 101. Base 86 is connected through a variable resistor 107 to the common ground. Base 86 is also connected to collector 166 of transistor 144. Base 86 is also connected through an integrating capacitor 77 to the common ground. A junction between resistors 70 and 71 is connected by a resistor 72 to a junction between resistors 89 and 93, which junction is also connected to a positive terminal of power input 94. A junction between resistors 154 and 155 is connected to collector 85 of transistor 75. Collector 85 is also connected to the negative terminal of power input 94. A capacitor 110 is connected across resistor 109 to form a low frequency compensating network indicated generally at 104. Collector 82 is connected through a capacitor 111 to a vertical output terminal 112. Another vertical output terminal 113 is connected to the common ground. The pair of vertical output terminals 112 and 113 are adapted to be connected to the vertical input terminals of an oscilloscope.

Before discussing the operation of the embodiment of this invention shown in the drawings, it is necessary to understand the eventual operation or use of the thin film magnetic elements of array 18 as used in, for example, a memory circuit, and to describe with reference to the drawings the magnetic parameters which it is desired to test for this invention.

Ideally a thin film element, or bit, will behave as a single magnetic domain. That is, they will switch faster than magnetic materials exhibiting domain wall switching. It is known that magnetic materials having thicknesses greater than approximately 3000 angstroms have multidomain structures and display pronounced domain wall motion switching characteristics which increase the time required for the switching process. Thin films of the thickness of 1000 angstroms exhibit very limited domain wall switching when operating properly, and are theoretically restricted to single domain rotational switching when transverse fields are applied.

Operation of a single bit in a memory array will be explained by reference to FIG. 4. During the memory storage operation, a signal is stored when bit 32 is magnetized in either direction along the easy axis 27. The stored information is read out of the bit 32 by first applying a current in word current line 33 to produce a magnetic field in a direction transverse to the easy axis 27. The result will be to rotate the effective magnetization of bit 32 toward the direction of hard axis 28. The field motion produced by the rotating magnetization induces an output voltage in sense line 39. The polarity of the output voltage depends upon the direction of the original magnetization of bit 32 along easy axis 27. After the magnetization of bit 32 has been rotated to be along hard axis 28, a current is applied in digit line 34, thereby establishing a field parallel to easy axis 27. If the digit field from digit line 34 is established in the direction of original magnetization along the easy axis 27, the digit field will return the magnetization of bit 32 to its initial position. If the direction of the digit field is opposite to the direction of original magnetization, bit 32 will be magnetized in the reverse direction along the easy axis 27. The digit current is referred to as "restore" digit current if the bit magnetization is returned to its original position, and as "write" digit current if the bit magnetization is driven in the opposite direction.

Various thin film physical and magnetic properties are necessary to determine the suitability of thin film arrays for use as memory elements. Two important properties, total film saturation flux in the easy direction 27 and film thickness, may be measured by means of the easy direction saturation hysteresis loop 29 as seen in FIG. 6. The distance between horizontal sides 48 and 49, as measured along the B coordinate axis, represents the saturation flux of thin film array 18. For a given configuration of magnetic bits in the array and for a given total area of magnetic bits, and also for a given film composition, the saturation flux is proportional to the film thickness. Depending upon the oscilloscope scale used, saturation flux, measured in gauss, may be converted into film thickness measured in angstroms.

Another magnetic parameter which it is desired to measure is magnetic symmetry. That is, the thin film magnetic array 18 should have approximately symmetrical magnetic characteristics in both direction of magnetization along the easy axis 27 or the hard axis 28. Referring again to FIGS. 6 and 7, the hysteresis loops 29 and 30 may be individually shown on an oscilloscope. By proper adjustment of the input to the oscilloscope the hysteresis loop may be collapsed to a dot. Then, by centering the dot at center point 51, at the intersection of the B-H coordinates, when the hysteresis loop is again blown up on the oscilloscope, symmetry around either coordinate may be measured.

Another important parameter to be measured by the apparatus of this invention, is the skew angle 56 which the actual easy axis 26 makes with the theoretical easy axis 27, as previously described in the discussion of FIG. 3. An excessive skew reduces memory stability during storage of information, and increases switching time. The skew is related to the symmetry of the hysteresis loop. When the loop is most symmetrical the skew angle 56 is the least. Therefore, the skew of the actual axis 26 may be represented by the angle that the rows of bits or thin film elements in array 18 makes with the drive field axis, when the hysteresis loop is most symmetrical. This measurement is made by placing array 18 in receptacle 17 with hard axis 28 parallel to the drive field from coil 14. This could also be done by placing easy axis 27 parallel to the drive field, but symmetry is more easily recognized in the narrower hard axis hysteresis loop 30, as seen in FIG. 7. Array 18 is then rotated so that hard axis 28 makes an angle in the horizontal plane with the drive field axis. Hysteresis loop 30 will either distort or become more symmetrical with rotation of array 18. When hysteresis loop 30 is most symmetrical, hard axis 28 is considered to be parallel to the drive field axis. The average skew angle 56 of array 18 may then be measured by measuring the angular distance between the alignment of the rows of bits of array 18 and the drive field axis.

Another parameter which may be measured is called the magnetostriction of array 18 on substrate 20. A thin film element with magnetostriction will change its skew angle, and also change the shape of its hysteresis loop, when subjected to a strain. A non-magnetostrictive film will show no changes in the shape of its hysteresis loop when subjected to a strain. It is thus obvious that it is desirable to use only those films which exhibit very low magnetostriction, to avoid any change in the values of the magnetic parameters due to accidental stress in the film. To measure magnetostriction in the apparatus of this invention, substrate 20 is manually bent and strained while in receptacle 17. Any resulting distortion in hysteresis loops 29 and 30 may be measured by displaying them on an oscilloscope, and arrays with excessive distortion may be discarded.

There are three magnetic parameters which may also be measured on the apparatus of this invention, all of which relate to the magnetic field intensity, as represented by the H coordinate in FIGS. 6 and 7. These three magnetic parameters include the coercivity, $H_c$, which is the longitudinal field which will cause a saturated film to reverse its magnetization; the anisotrophy field, $H_k$, which is the field necessary to magnetize the film in the hard axis direction; and the switching field, $H_w$, which is the field necessary to initiate the film magnetization switching. The method of measuring the values of these parameters from a hysteresis loop is described in the above discussions of FIGS. 6 and 7. The value of the coercivity $H_c$ determines, in two ways, the suitability of the thin films as memory elements. A small value of $H_c$ means that only a small magnetic field is necessary to reverse the direction of magnetism. If $H_c$ is too small, disturbing effects from adjacent memory circuitry will make an array unreliable as a memory storage device. If $H_c$ is too large, the "restore" or "write" currents from a memory address unit may be insufficient to switch the film to the easy axis. The hysteresis loop 29 of FIG. 6 may be displayed on an oscilloscope and the value of $H_c$ measured to determine if it is too large or too small.

The point at which magnetic switching begins to occur is the point $H_w$ as shown in FIG. 6. It is desirable that the value of $H_w$ be as large as possible, and if hysteresis loop 29 were ideally rectangular, $H_w$ would be as large as $H_c$. If $H_w$ is small compared to $H_c$, sides 68 and 69 of hysteresis loop 29 would be more slanted, which could indicate a large dispersion in the distribution of the $H_c$ values of the individual elements. Also, a relatively small $H_w$ would indicate poor stability of the thin film as a memory element, since disturbing effects from neighboring circuitry would more easily produce small unintended outputs from the array due to the low value at which magnetic switching would begin to occur. With the apparatus of this invention hysteresis loop 29 may be displayed on an oscilloscope and the value of $H_w$ measured to determine whether array 18 should be rejected.

The value of field intensity which is approximately sufficient to magnetize the film elements of array 18 in the direction of hard axis 28 is termed the anisotrophy field, $H_k$. The method of calculating $H_k$ is described in the above discussion of FIG. 7. In the manufacture of thin film elements, it is desirable to keep $H_k$ as small as possible since it determines the strength of the output signal from memory element 32 when it is switched from magnetization in the direction of easy axis 26 to magnetization in the direction of hard axis 28. If $H_k$ is too large, the magnetization element 32 will not completely switch to the direction of hard axis 28 during a write operation, and the output signal will be too small or nonexistent. Hysteresis loop 30 of FIG. 7 may also be displayed on an oscilloscope by the apparatus of this invention to determine the proper value of $H_k$.

The operation of the apparatus of this invention will first be broadly described with reference to the block diagram of FIG. 8. The oscillator 127 provides a calibrated 1 kc. signal which is amplified by power amplifier 126 and fed to drive coil 14 to provide a drive field around array 18 placed in receptacle 17. A portion of the 1 kc. signal is fed through phase shift network 123 to horizontal input terminal 147 of oscilloscope 129. A sample portion of the 1 kc. drive signal is also sent to noise cancellation network 124. The change in magnetic flux of array 18, due to the drive field from drive coil 14, will be sensed only by pickup winding 16. Pickup coil 15 will be positioned to pick up all other magnetic effects that will be felt by pickup coil 16, except that of the signal from array 18. Coils 15 and 16 are wound and connected in an arrangement such that they tend to cancel the voltage induced in each other. Ideally, this would result in a cancellation of the effects of all disturbing flux which are picked up by coil 15 to be subtracted from coil 16, however, since it is practically impossible to have the physical properties of coils 15 and 16 exactly the same, there will be remaining undesirable induced voltage superimposed on the signal from array 18. Therefore, the signal from array 18 is fed into noise cancellation network 124 after being effected by coils 15 and 16. In noise cancellation network 124 there are phase and amplitude discrimination networks which eliminate all but the desired signal from array 18. The signal from array 18 will be proportional to the rate of change of the alternating magnetic flux of array 18. This signal is fed from noise cancellation network 124 to integrator-amplifier 122 where is is integrated and amplified such that the output of integrator-amplifier 122 represents the changing magnetic flux of array 18 only. This output is then applied to vertical terminals 112 and 113 of oscilloscope 129 to combine with the input to horizontal terminals 147 and 150 to thus display the hysteresis loop of the array being tested.

In the operation of the invention as illustrated by FIG. 9, only pickup coil 16 is positioned around magnetic memory array 18 whose hysteresis characteristics are being analyzed. The alternating drive field produced by drive coil 14 alternates the magnetization of the thin film elements of array 18 under test. The magnetic field of each thin film element switches from one direction to another along the easy axis 27. The alternating magnetic flux of the entire thin film array 18 induces a voltage in pickup coil 16, proportional to the rate of change of flux, but none is induced in distantly positioned pickup coil 15. However, both pickup coils 15 and 16 are situated within the drive field of drive coil 14. Consequently, another voltage will be induced in both pickup coils 15 and 16 which is proportional to the rate of change of flux of the drive field.

Pickup coils 15 and 16 are connected in series opposition to cancel out the major portion of the induced drive field voltage, referred to hereafter as drive field pickup. However, some residual pickup may still be present due to differences in the pickup coils 15 and 16 themselves, and in their individual alignments with respect to the drive field. The relative amplitudes of the drive field pickup in each of pickup coils 15 and 16 are controlled by the in-phase balance control 136. By adjusting variable resistor 138, the value of the voltage divider comprising resistors 135, 133, 134, 137 and 138 will change such that more or less of the drive field is sensed by pickup coil 16, to balance as necessary the drive field pickup sensed in pickup coil 15. However, because of pickup coil differences, the phase of the drive field pickup in pickup coils 15 and 16 may still not be identical.

The drive field pickup from pickup coil 15, available at the junction of resistors 133 and 135, and the drive field pickup from pickup coil 16, available at the variable resistor 138, are applied to differential amplifier 142. If the drive field pickup from pickup coil 15 is out-of-phase with that from pickup coil 16, the output of differential amplifier 142 will represent that difference and will be approximately 90 degrees out-of-phase with both drive field pickups. This difference component may be accurately cancelled by proper adjustment of out-of-phase balance control 139. If the drive field pickup output of differential amplifier 142 is zero, then out-of-phase balance control 139, a voltage divider comprising resistor 140 and variable resistor 141, is set at the balance position to introduce identical signals to the bases 161 and 164 of transistors 143 and 144, respectively, of differential amplifier 142. If the drive field pickup output from differential amplifier 142 is finite, then out-of-phase balance control 139 is adjusted in one direction or the other to provide a pair of unbalanced signals to differential amplifier 142 whose difference exactly equals but is opposite in polarity to the difference between the drive field pickups appearing at differential amplifier 142. This results in a second output component from differential amplifier 142 equal in amplitude but opposed in polarity to the drive field pickup output component. The direction of the unbalance of variable resistor 141 in out-of-phase balance control 139 determines the polarity of the cancelling signal output from differential amplifier 142. The amount of unbalance of variable resistor 141 determines the amplitude of the cancelling output of differential amplifier 142.

When there is no magnetic thin film array in the drive field, and consequently no induced voltage due to thin film switching, proper cancellation of the drive field pickups is achieved when the total circuit output to vertical output terminals 112 and 113 is zero. This condition is visually recognized on an oscilloscope as a straight horizontal trace. If the pickup coils are not balanced the trace will be ballooned and slanted.

The alternating magnetic flux produced by the switching thin film elements of array 18 when placed in the drive field, induces a voltage in pickup coil 16 which is applied to differential amplifier 142. This signal is proportional to the rate of change of flux of array 18. Since this signal is applied to the differential amplifier 142 from only one pickup coil, the output of differential amplifier 142 is correspondingly proportional to the rate of change of flux of array 18. This output is represented as the voltage across resistor 155 and is measured across resistor 155. The voltage across integrating capacitor 77 represents the integration of the output signal from differential amplifier 142 and is therefore proportional to the changing flux in array 18. The integrated signal is amplified in the conventional amplifier circuit including transistor 76 and transistors 74 and 75. Variable resistor 107 controls the amplitude of the integrated signal introduced into the amplifying circuit and thus controls the magnitude of the output across terminals 112 and 113. The amplifier circuit including transistors 74, 75 and 76 is selected to have good low frequency response. The output of transistor 74 from collector 82 is applied to a low frequency compensating network 104, which acts to attenuate the high frequency components of the integrated signal and to compensate for the previously attenuated low frequency components produced by any imperfect integration in integrating capacitor 77. This compensated, integrated signal, still proportional to the changing flux of the array, is coupled to vertical output terminal 112 through coupling capacitor 111.

In practice, there is a small time delay, or phase difference, between the induced signal in pickup coil 16 and the circuit output voltage to vertical output terminals 112 and 113. This phase difference is caused by the propagation time through integrator-amplifier circuit 122. In order to insure an accurate hysteresis plot on oscilloscope 129, it is necessary that the drive field and the integrated output of integrator-amplifier 122 be in phase. To compensate for this propagation phase difference, the drive field signal, from sampling resistor 130, is applied to horizontal input terminals 147 and 150 of oscilloscope 129 through phase shift circuit 123 comprising resistor 148 and variable capacitor 149. Adjustment of variable capacitor 149 will produce a small phase lag or time delay in the drive field signal which can be made equal to the time delay in the integrated signal.

It is thus apparent that this invention provides apparatus which, through the use of an additional coil connected in series opposition with the usual pickup coil surrounding a magnetic thin film array, and the use of noise elimination circuits, provides a substantially error free signal from which a hysteresis loop may be displayed on an oscilloscope for important measurements of pertinent parameters of magnetic thin film elements.

It will be obvious that the general principles herein disclosed may be embodied in many forms other than that specifically illustrated without departing from the spirit of the invention as defined in the following claims.

What is claimed is:

1. Test apparatus for an array of film magnetic elements comprising:

a source of energy in the form of a bidirectional current;

a drive coil electrically connected to said source of energy for producing a magnetic drive field;

first and second pickup coils mounted within said magnetic drive field;

means for mounting the array of magnetic elements within said first pickup coil so that the magnetic signal from all the film magnetic elements of the array will be sensed only by said first pickup coil;

said second pickup coil mounted in spaced relation to said first pickup coil and remote from the array of magnetic elements to prevent sensing by said second pickup means of the magnetic signal from the array;

signal sensing means including in-phase balance control means connected across said first and second pickup coils, and being variable for balancing out any difference in amplitude of induced voltage between said first and second coils due to said magnetic drive field; difference amplifying means having first and second input terminals; means including said in-phase balance control means connecting said first and second pickup coils, respectively, to said first and second input terminals; sample signal input terminals adapted to receive a sample of the bidirectional energy applied to said drive coil; out-of-phase balance control means connected across said first and second input terminals, and connected to said sample signal input terminals, for balancing out errors in phase between the magnetic drive field signal induced in said first and second pickup coils; and means connected to an output terminal on said difference amplifier to provide a signal for display and measurement;

and means connecting said first and second pickup coils in series opposition across said signal sensing means, for providing a signal from the array of magnetic elements substantially unaffected by said magnetic drive field.

2. Test apparatus for an array of magnetic elements on a substrate comprising:

drive coil means wound around a first axis and defining an internal area;

means connecting said drive coil to a source of alternating potential for creating a magnetic drive field within said internal area;

signal coil means wound around a second axis and defining a further internal area, said signal coil means being mounted within said internal area defined by said drive coil means so that said second axis is parallel to said first axis;

bucking coil means wound around a third axis and mounted within said internal area defined by said drive coil means so that said third axis is parallel to said first axis;

means in said further internal area defined by said signal coil means adapted to hold the substrate, the substrate when held and said bucking coil means being in spaced relation to prevent pickup by said bucking coil means of signals from the magnetic elements on the substrate;

signal sensing means including noise elimination means and having input and output terminals;

said signal sensing means including further input terminals adapted to receive a sample of the frequency of the source of alternating potential;

means connecting said signal coil means and said bucking coil means in series opposition across said input terminals;

and display and measurement means connected to said output terminals.

3. The apparatus of claim 2 in which said noise elimination means comprises:

variable voltage divider means connected to said signal coil means and said bucking coil means for balancing the amplitude of signal from each one due to said magnetic drive field;

difference amplifier means adapted to measure the difference in signal between said signal coil means and said bucking coil means;

and variable connection means connected to said further input terminals and said difference amplifier for balancing the phase between the signals from said signal coil means and said bucking coil means.

References Cited

UNITED STATES PATENTS

| | | | |
|---|---|---|---|
| Re. 19,600 | 6/1935 | Hermann | 324—34 |
| 3,260,928 | 6/1966 | Hunt et al. | 324—34 |

OTHER REFERENCES

Crittenden et al., B-H Meter for Samples of Small Cross-Sectional Area, The Review of Scientific Instruments, October 1946, pp. 372–374.

Crittenden et al., Magnetization Hysteresis Loop Tracer for Long Specimens of Extremely Small Cross Section, The Review of Scientific Instruments, December 1951, vol. 12, pp. 872–877.

Arndt, Automatic BH Curve Tracer, Brush Strokes, March 1951. pp. 1–9.

RUDOLPH V. ROLINEC, *Primary Examiner.*

RICHARD B. WILKINSON, *Examiner.*

R. J. CORCORAN, S. B. GREEN, *Assistant Examiners.*